(12) United States Patent
O'Reilly

(10) Patent No.: US 11,777,298 B2
(45) Date of Patent: Oct. 3, 2023

(54) LIGHTNING DIVERTER SYSTEM AND METHODS

(71) Applicant: Sean O'Reilly, Tequesta, FL (US)

(72) Inventor: Sean O'Reilly, Tequesta, FL (US)

( * ) Notice: Subject to any disclaimer, the term of this patent is extended or adjusted under 35 U.S.C. 154(b) by 0 days.

(21) Appl. No.: 17/373,962

(22) Filed: Jul. 13, 2021

(65) Prior Publication Data
US 2022/0014008 A1 Jan. 13, 2022

Related U.S. Application Data

(60) Provisional application No. 63/051,001, filed on Jul. 13, 2020.

(51) Int. Cl.
*B63B 43/00* (2006.01)
*H02G 13/00* (2006.01)

(52) U.S. Cl.
CPC ............. *H02G 13/60* (2013.01); *B63B 43/00* (2013.01); *H02G 13/80* (2013.01)

(58) Field of Classification Search
CPC ........ H02G 13/00; H02G 13/60; H02G 13/80; B63B 43/00; H02H 9/04; H01C 7/12; H01C 8/04
USPC .................................................. 361/212, 220
See application file for complete search history.

(56) References Cited

U.S. PATENT DOCUMENTS

| | | | |
|---|---|---|---|
| 4,447,847 A * | 5/1984 | Drulard | H02G 13/00 361/117 |
| 4,796,153 A | 1/1989 | Amason et al. | |
| 5,657,197 A * | 8/1997 | Skinner, II | H02G 13/80 174/3 |
| 8,154,839 B2 | 4/2012 | Stenstroem et al. | |
| 8,711,538 B2 | 4/2014 | Woodworth et al. | |
| 2007/0217112 A1 | 9/2007 | Lagnoux | |
| 2008/0310071 A1 | 12/2008 | Jeon | |
| 2012/0217058 A1 | 8/2012 | Higby | |
| 2014/0262410 A1 | 9/2014 | Behr | |
| 2014/0355164 A1 | 12/2014 | Dangy-Caye | |

(Continued)

FOREIGN PATENT DOCUMENTS

| | | |
|---|---|---|
| CN | 205141373 U | 4/2016 |
| CN | 110336241 A | 10/2019 |
| EP | 2509177 B1 | 10/2012 |

*Primary Examiner* — Danny Nguyen
(74) *Attorney, Agent, or Firm* — Derek Fahey, Esq.; The Plus IP Firm, PLLC

(57) ABSTRACT

A lightning diverter system is disclosed including an outer rod having a first outer rod segment, a second outer rod segment, and a housing cabinet; and an inner rod having a first inner rod segment and a second inner rod segment. The second inner rod segment is in attachment with the second outer rod segment. The inner rod and the outer rod are concentric and configured to move between a rod extended configuration and a rod retracted configuration. A conductive break is in attachment with the outer rod and the inner rod. The lightning diverter system further includes a sensor configured for monitoring an environmental parameter and sending a first signal to a processor configured for determining if the environmental parameter fails satisfy an environmental parameter threshold and sending a second signal to move the lightning diverter system between the rod retracted configuration and rod extended configuration.

20 Claims, 15 Drawing Sheets

(56) References Cited

U.S. PATENT DOCUMENTS

2015/0124365 A1    5/2015  Chung
2021/0263189 A1*   8/2021  Chung .................. G08B 21/10

\* cited by examiner

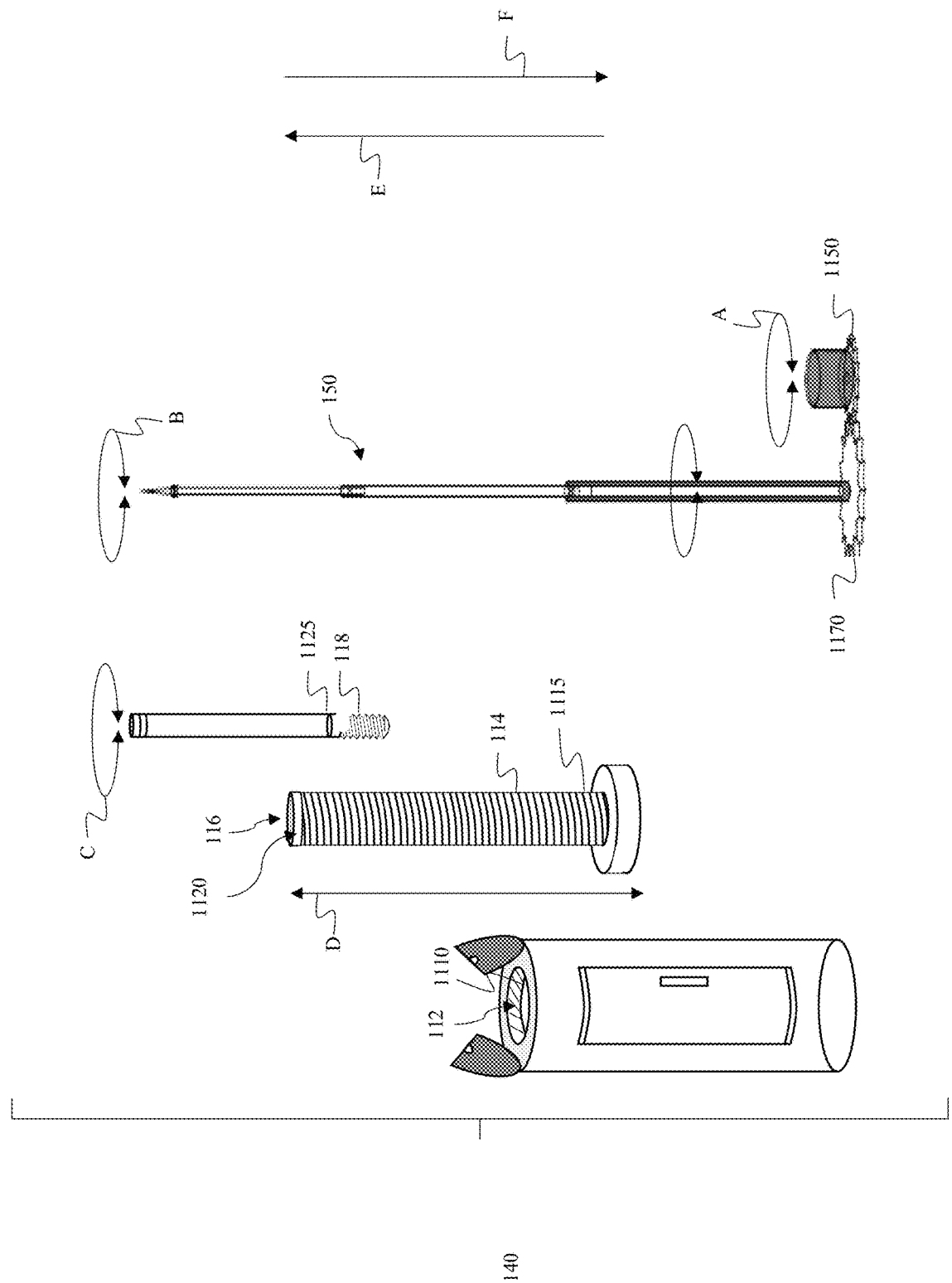

LIGHTNING DIVERTER SYSTEM AND METHODS

CROSS-REFERENCE TO RELATED APPLICATIONS

This application is related to, and claims the benefit of priority to provisional patent application No. 63/051,001 titled "LIGHTNING DIVERTER SYSTEM," which was filed on Jul. 13, 2020. It is hereby incorporated in its entirety by reference.

STATEMENT REGARDING FEDERALLY SPONSORED RESEARCH OR DEVELOPMENT

Not applicable.

INCORPORATION BY REFERENCE OF MATERIAL SUBMITTED ON A COMPACT DISC

Not applicable.

TECHNICAL FIELD

The present disclosure relates to the field of lightning protection and grounding devices, and more specifically to the field of lightning protection for watercraft.

BACKGROUND

Currently, the Southeastern United States experiences a higher flash density of lighting produced by thunderstorms than any other area of the United States. These lightning strikes average one inch in width and five miles long, and approximately one in every five lightning strikes contacts the ground. The twenty percent 20% of lightning strikes that contact the ground pose significant risks for watercraft owners in the highly populated coastal regions of the Southeastern United States.

During a thunderstorm, lightning is formed when negatively charged ions build up in a cloud. The negative charges then create a downward channel which propagates to the nearest population of positive charges. When the negative channel propagates and contacts the cluster of positive charges, the positive charges rush upwards through the negative channel creating a powerful electric bolt.

Generally, the tallest object in the area falls victim to the lightning strikes, usually trees; however, in coastal areas and marinas, watercraft is the main target for lightning strikes. Sailboats, fishing boats, and yachts are usually the tallest watercraft in a marina extending its mast to heights of up to hundreds of feet above sea level. In the Southeastern United States, the average elevation of land proximate to the coast is approximately 6 feet above sea level and the average height of a two-story home is approximately 25 feet. In these regions, watercraft are generally the tallest objects in the area and the most susceptible target for lightning strikes.

Due to its size, sailboats, large fishing boats, and large yachts are more likely to be struck by lightning than any other watercraft in a marina or docked near a residence because its size exceeds that of the surrounding environment. The larger the watercraft then the higher the probability that lightning will strike it. Also, the larger watercraft, the most expensive damage is to repair. When lightning strikes a watercraft, electricity travels down to the hull causing considerable damage to sensitive electrical equipment, fiberglass, windows, and the lightning may even compromise the hull of the watercraft rendering it inoperable. The extent of these damages can range from the thousands to the tens of thousands of dollars in repairs for these large watercraft owners. Existing technology focuses primarily on protecting people from lightning strikes; thus, the focus on protecting property and mitigating property damage is merely a lower priority afterthought.

As a result, there exists a need for improvements over the prior art and, more particularly, a more efficient and effective way to protect watercraft property from the costly damages resulting from lightning strikes.

SUMMARY

A system for detecting and diverting lightning is disclosed. This Summary is provided to introduce a selection of disclosed concepts in a simplified form that are further described below in the Detailed Description including the drawings provided. This Summary is not intended to identify key features or essential features of the claimed subject matter. Nor is this Summary intended to be used to limit the claimed subject matter's scope.

In one embodiment, a lightning diverter system is disclosed. The system includes an outer housing cabinet having an opening on the upper end. An outer rod is defined by a first outer rod segment, a second outer rod segment, and the housing cabinet. An inner rod is defined by a first inner rod segment and a second inner rod segment. The second inner rod segment is in attachment with the second outer rod segment. The inner rod and the outer rod are concentric and configured to move between a rod extended configuration and a rod retracted configuration. A conductive break is in attachment with the outer rod and the inner rod. At least one sensor is configured for monitoring at least one environmental parameter and sending at least one first signal to at least one processor. The processor is configured for i. receiving the at least one first signal from the at least one sensor, ii. determining if the at least one environmental parameter fails satisfy at least one environmental parameter threshold, and iii. sending at least one second signal to at least one of a plurality of electrical components in electrical communication with the at least one processor.

Additional aspects of the disclosed embodiment will be set forth in part in the description which follows, and in part will be obvious from the description, or may be learned by practice of the disclosed embodiments. The aspects of the disclosed embodiments will be realized and attained by means of the elements and combinations particularly pointed out in the appended claims. It is to be understood that both the foregoing general description and the following detailed description are exemplary and explanatory only and are not restrictive of the disclosed embodiments, as claimed.

BRIEF DESCRIPTION OF THE DRAWINGS

The accompanying drawings, which are incorporated in and constitute part of this specification, illustrate embodiments of the disclosure and together with the description, explain the principles of the disclosed embodiments. The embodiments illustrated herein are presently preferred, it being understood, however, that the disclosure is not limited to the precise arrangements and instrumentalities shown. The following is a brief description of the figures.

FIG. 11 is a partially exploded view of the lightning diverter system and illustrates the movement between the rod extended configuration and the rod retracted configuration, according to an example embodiment.

DETAILED DESCRIPTION

Figure 1:
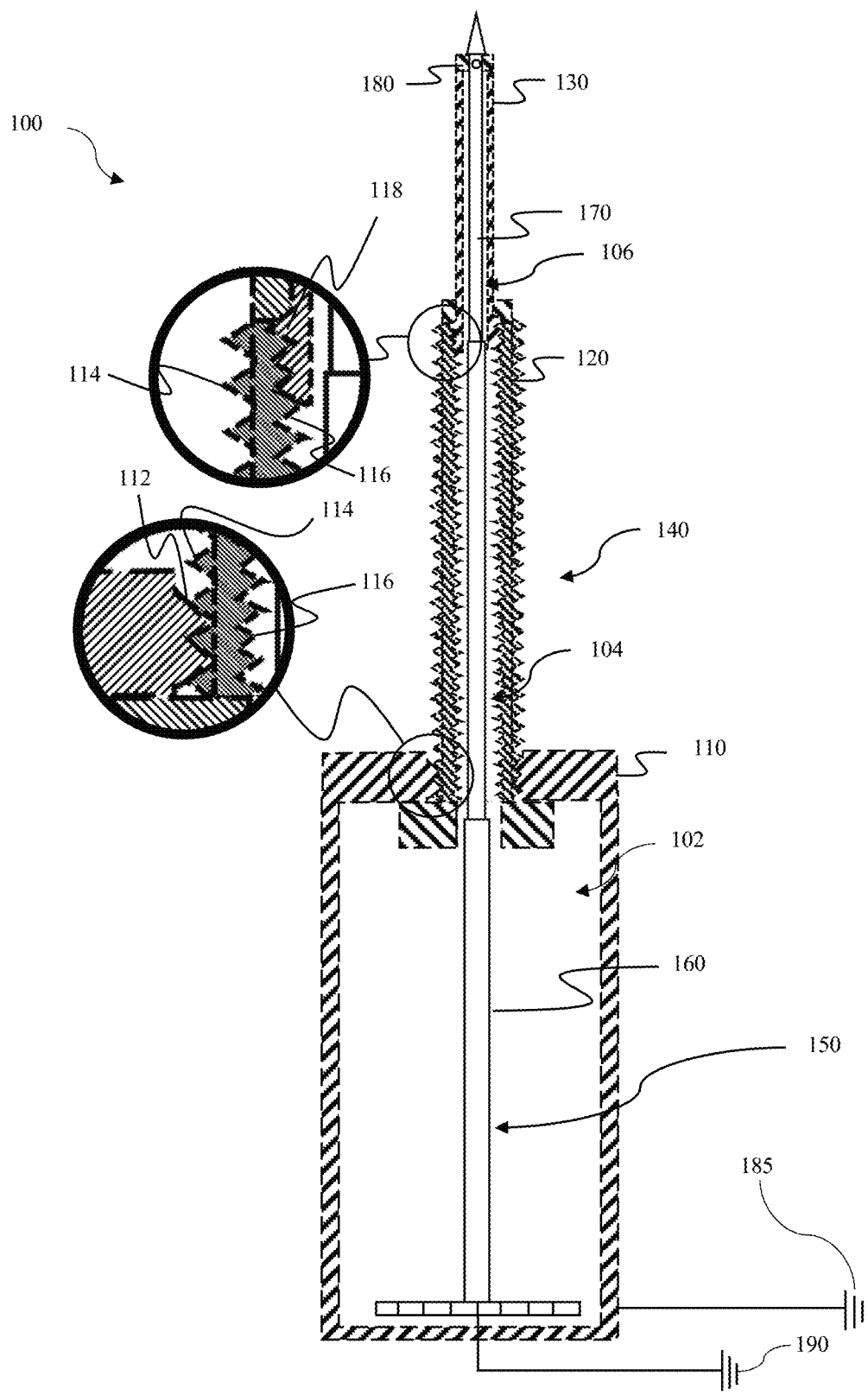
FIG. 1 is a partial cross-sectional side view of a lightning diverter system illustrating an inner rod concentrically positioned within an outer rod in a rod extended configuration, according to an example embodiment.

The following detailed description refers to the accompanying drawings. Whenever possible, the same reference numbers are used in the drawings and the following description to refer to the same or similar elements. While disclosed embodiments may be described, modifications, adaptations, and other implementations are possible. For example, substitutions, additions, or modifications may be made to the elements illustrated in the drawings, and the methods described herein may be modified by substituting, reordering, or adding additional stages or components to the disclosed methods and devices. Accordingly, the following detailed description does not limit the disclosed embodiments. Instead, the proper scope of the disclosed embodiments is defined by the appended claims.

The disclosed embodiments improve upon the problems with the prior art by providing a lightning diverter system used to detect electrical differences in the surrounding environment to trigger an extendable, motor driven, lightning rod to heights capable of redirecting lightning strikes from contacting and damaging watercraft. Unlike the prior art, the embodiments disclose a rod extended configuration and a rod retracted configuration. The embodiment uses sensors to detect electrical differences in the atmosphere within a predetermined area, the precursor to lightning strikes. When electrical differences in the air are detected, a motor in attachment with the bottom of the inner rod is engaged. As the motor rotates the bottom of the inner rod, the inner is operationally coupled to the outer rod. The outer rod rotates with the inner rod and is driven upward via the treaded engagement between the fourth threaded section and third threaded section. Once the second outer rod segment is fully extended, the second threaded section is threadedly engaged with the first threaded section, and, in turn, the first outer rod segment further drives the inner rod to the optimal height and the rod extended configuration.

Unlike the prior art, the operational configuration between the inner rod and the outer rod can extend and retract based on the electrical differences in the atmosphere and it can resist the high wind speeds and the respective wind forces present during lightning storms and in coastal areas. It is understood that the present disclosure improves over the prior art by providing a rotary motion to extend and retract the lightning diverter system. The rotation of the motor operationally configured with the inner rod and the outer rod allows the lightning diverter system to extend to heights able to divert lightning away from striking property. As the lightning diverter system rotates relative to the static electricity threshold levels, the inner rod is disposed inside of the outer rod. The rotation of the system allows the first outer rod segment and the housing cabinet to threadedly engage each other to drive the system into the rod extended configuration or completely collapse the system into the rod retracted configuration. As the elements threadedly engage each other, the second outer rod segment is the first segment to drive the lightning diverter system into either the rod extended configuration, or the rod retracted configuration. It is understood that as the outer lighting rod transitions between the rod extended configuration and the rod retracted configuration and that the outer rod is operationally coupled with the inner rod. The outer rod and the inner rod provide for a dual structural support to the lightning rod system where the outer rod and the inner rod provide increased structural rigidity to the system with the ability to withstand an increased amount of wind loading resistance. Additionally, it is understood that the double rod configuration, having an insulator between them, provides an improvement over the prior art in that two paths to ground are provided within a single system. It is understood that other improvements may also be associated with the lightning diverter system that are within the spirit and scope of the present disclosure.

Referring now to FIG. 1, a partial cross-sectional view of a lightning diverter system 100 illustrating an inner rod concentrically positioned within an outer rod in a rod extended configuration is shown, according to an example embodiment. The lightning diverter system includes a housing cabinet 110 having an opening on an upper end of the housing cabinet, an outer rod 140 including a first outer rod segment 120, a second outer rod segment 130, and the housing cabinet, and an inner rod 150 including a first inner rod segment 160 and a second inner rod segment 170. It is understood that a cross-sectional view of the outer rod is shown. The inner rod and the outer rod are concentric and configured to move between a rod extended configuration and a rod retracted configuration. In one embodiment, the inner rod is substantially disposed within the outer rod such that the top of the second inner rod segment may extend beyond the top of the second outer rod segment. A conductive break 180 is in attachment with the outer rod and the inner rod.

The lightning diverter system further includes at least one sensor configured for monitoring at least one environmental parameter and sending at least one first signal to at least one processor. The at least one processor is configured for receiving the at least one first signal from the at least one sensor; determining if the at least one environmental parameter fails satisfy at least one environmental parameter threshold; and sending at least one second signal to at least one of a plurality of electrical components in electrical communication with the at least one processor. In one embodiment, the at least one sensor is located on the housing cabinet. In another embodiment, the at least one sensor is located on the tip of the second inner rod segment. However the sensor may be positioned at different locations.

In one embodiment, the inner rod is made from a first conductive material and the outer rod is made from a second conductive material. In other embodiments, the inner rod and the outer rod may include the same conductive material where such conductive materials include materials such as aluminum, steel, copper, titanium, aluminum alloys, steel alloys, copper alloys, titanium alloys, and other conductive materials. However, other materials may be used and are within the spirit and scope of the present disclosure.

The conductive break may include a variety of non-conductive materials such as rubber bushings, insulated glazing, air breaks, gas breaks, low thermal polyamide, polyurethane, ceramic, fiberglass, glass, paper, Teflon®, plastics, rubber-like polymers, and other thermal breaks and electrical insulators.

The outer rod includes at least a first partially tubular shaped body where the tubular shaped body is configured to allow the concentric disposition of the inner rod within the outer rod. The inner rod includes at least a second partially shaped body such that the first inner rod second is defined by a tubular shape configured to allow the first tubular shaped body to concentrically position within the hollow cavity in a telescoping manner. In some embodiments, the second inner rod segment may include a solid rod defined by a conductive material. The conductive material, of the lightning diverter system, including the inner rod and the outer rod, can intercept a lightning strike from striking property and divert the voltage safely to ground. Because, in some embodiments, the outer rod and the inner rod comprise two different conductive materials, the lightning diverter system provides two distinct paths to ground to divert the voltage from a lightning strike away from property and into the earth.

Furthermore, because the outer rod is substantially tubular, it contains a hollow cavity to concentrically dispose the inner rod within it, acting as a shell. The air within the cavity of the outer rod between the inner rod and the interior walls of the outer rod acts as a conductive break, or air break, between the inner rod and the outer rod. The housing cabinet includes a first cavity 102, the first outer rod segment includes a second cavity 104, and the second outer rod segment includes a third cavity 106. The inner rod is conductively separated from the outer rod such that the inner rod is in attachment with the outer rod via the conductive break 180 and is disposed within the outer rod separated by the air breaks, including the first cavity, second cavity, and third cavity. Therefore, because the inner rod is conductively separate from the outer rod, each of the inner rod and the outer rod is configured to intercept lightning and provide a conductive path of voltage safely to ground. The outer rod includes a first conductive path to ground 185 and the inner rod comprises a second conductive path to ground 190. Each of the first conductive path to ground and the second conductive path to ground may include a variety of grounding electrode conductors, typically copper, and are configured to provide a conductive path for voltage to disperse between the lightning diverter system and the ground connection. The first conductive path to ground and the second conductive path to ground may further include a grounding rod embedded under ground and extending variable distances, generally at least eight feet, below the surface.

In some embodiments, the inner rod contains a plurality of first inner rod segments where each additional inner rod segment has a diameter smaller than the first inner rod segment to allow the inner rod to telescope between the rod extended and rod retracted configurations. Likewise in some embodiments, the outer rod includes a plurality of first outer rod segments where each additional outer rod segment has a diameter smaller than the outer rod segment of which it is concentrically disposed within to allow the inner rod to telescope between the rod extended and rod retracted configurations. The number of respective rod segments depends on a predetermined maximum height. For example, in residential communities, regulations permit free standing poles up to 20 feet in height. In other embodiments, where the lightning diverter system is secured to a boat dock for example, the predetermined height may be defined by a height greater than the height of a boat above the surface of the water. However, in each embodiment, the height or length of the housing cabinet is greater than the length of the longest outer rod segment or inner rod segment to allow the lightning diverter system to be housed within the housing cabinet in the rod retracted configuration.

Each of the first outer rod segment, second outer rod segment, first inner rod segment, and second inner rod segment may contain a flanged or lipped portion on at least one end of the respective segment configured to prevent the respective concentrically disposed segment from extending beyond the length of the segment which it engages. This allows the lightning diverter system to remain in a telescopic position in the rod extended configuration. In other embodiments, the outer rod and inner rod may include at least partially tubular shaped bodies where the tubular shaped bodies are tapered. For example, the first inner rod segment may have a first diameter greater at the base of the lightning diverter system and taper upwards towards a second smaller diameter. Both the first diameter and the second diameter will be larger than the diameter of the respective segment which is concentrically disposed within it. The tapering of the inner rod segment allows the upper portion to pressure fit the segments together in the extended configuration to enhance rigid stability.

In other embodiments, the lightning diverter system may include lead lines connected to the ground or other structure at a first end and removably attached to the lightning diverter system, such as the uppermost portion of the second inner rod segment. When the system is in the rod extended configuration, as depicted in FIG. 1, the outer rod, the first outer rod segment, the second outer rod segment, the inner rod, the first inner rod segment, and the second inner rod segment may be removably attached to the lead lines to anchor and to support the system against wind loading, according to an example embodiment.

Furthermore, the housing cabinet 110 may be removably attached to a surface via at least one fastener, in an example embodiment. In another embodiment, the cabinet housing may be removably attached to a dock alongside a body of water. The at least one fastener may be a plurality of fasteners. The housing cabinet may be constructed from carbon steel, stainless steel, aluminum, Titanium, other metals or alloys, composites, ceramics, polymeric materials such as polycarbonates, such as Acrylonitrile butadiene styrene (ABS plastic), Lexan™, and Makrolon™. The housing cabinet may also include a conductive material of the outer rod and providing a path to ground. Embodiments where the housing cabinet includes an insulative material on the interior walls of the housing cabinet to protect the electrical components from excess voltage are within the spirit and scope of the disclosure. The components of the hosing may be manufactured from a variety of different processes including an extrusion process, a mold, welding, shearing, punching welding, folding etc. The at least one fastener may be constructed out of a suction cup, hooks, bolt, set crews, opening configured to attached to protruding element, socket screws, U-bolts, twine, etc. However, other types of fasteners may also be used and are within the spirit and scope of the present invention.

In addition, the ground leads may include the first conductive path to ground 185 and the second conductive path to ground 190 may be disposed below the surface of the earth, in an example embodiment. In another embodiment, the ground leads may telescope downward via an external controlling device in electrical communication to dispose the ground leads further below the ground or surface of the earth. The ground leads may be wires with an outer housing that is electronically and thermally insulating and an inner housing that is electronically and thermally conductive.

The lightning diverter system includes a first threaded section 112 on an inward facing surface of the opening of the housing cabinet. A second threaded section 114 on an outward facing surface of the first outer rod segment is configured to threadedly engage with the first threaded section. The lightning diverter system includes a third threaded section 116 on an inward facing surface of the first outer rod segment. A fourth threaded section 118 on an outward facing surface of the second outer rod segment is configured to threadedly engage with the third threaded section. Each of the first threaded section, second threaded section, third threaded section, and fourth threaded section are in operatively engaged as to include a conductive material to direct voltage through each element of the outer rod.

Figure 2:
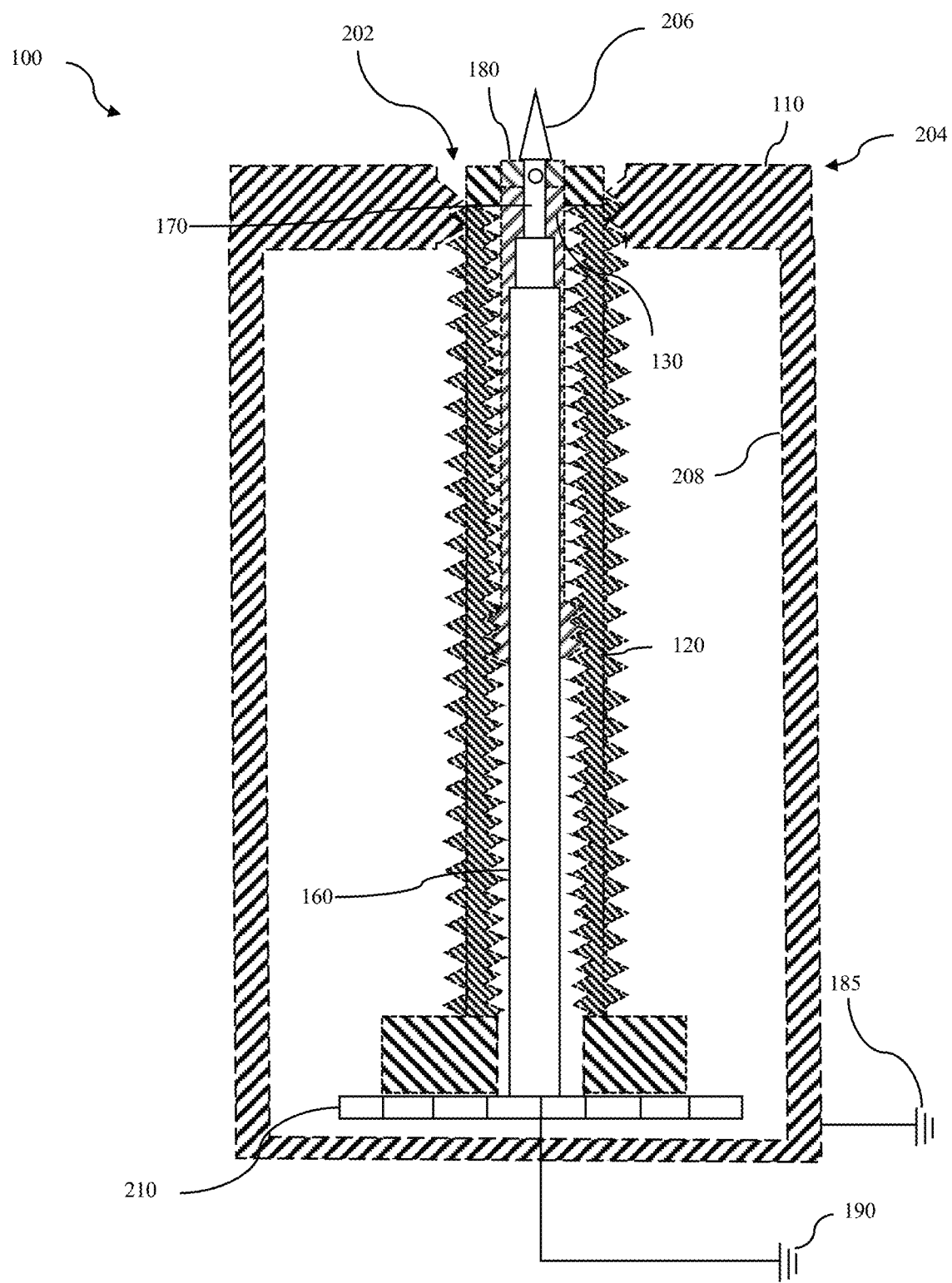
FIG. 2 is a partial cross-sectional side view of the lightning diverter system illustrating the inner rod concentrically positioned within the outer rod in a rod retracted configuration, according to an example embodiment.

Referring now to FIG. 2, a partial a partial cross-sectional view of the lightning diverter system illustrating the inner rod concentrically positioned within the outer rod in a rod retracted configuration is shown, according to an example embodiment. The housing cabinet 110 has an opening 202 on an upper end of the housing cabinet 204. As illustrated, the inner rod is substantially disposed within the cavity of the housing cabinet such that only an upper portion 206 of the second inner rod segment extends beyond the containment of the housing cabinet. The lightning diverter system includes a gear 210 in attachment with the inner rod. The gear 210 may include a belt system in attachment with a motor. As illustrated, because the outer rod contains a plurality of cavities due to its substantially tubular shape, the inner rod is substantially disposed within the outer rod. The tubular shape of the inner rod and the outer rod increases the structural rigidity of the lightning diverter system and reduces external wind loading forces that may act on the lightning diverter system. In another embodiment, the interior walls 208 of the housing cabinet may be insulated to protect a plurality of electrical components of the lightning diverter system.

Figure 3:
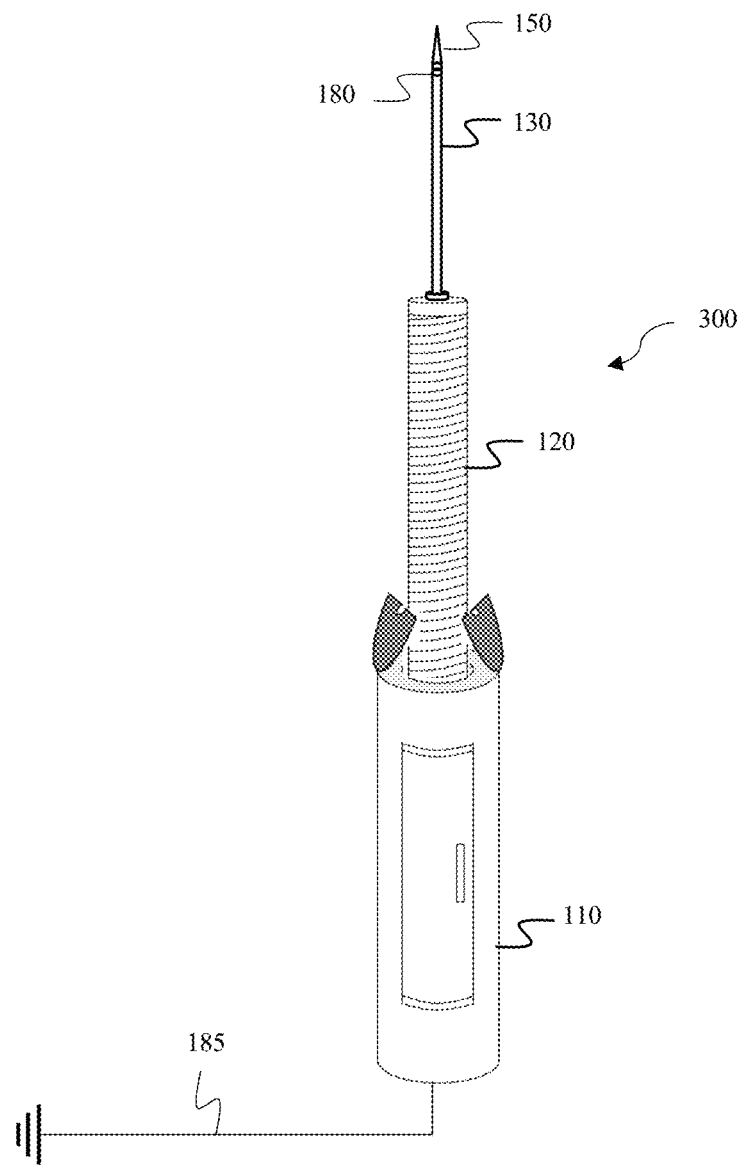
FIG. 3 is a front perspective view of the lightning diverter system in the rod extended configuration, according to an example embodiment.
Figure 4:
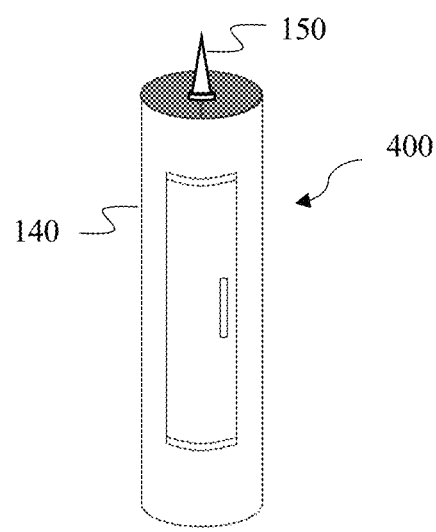
FIG. 4 is a front perspective view of the lightning diverter system in the rod retracted configuration, according to an example embodiment.

Referring now to FIG. 3 and FIG. 4, a front perspective view of the lightning diverter system is shown, according to an example embodiment. FIG. 3. is a front perspective view of the lightning diverter system in the rod extended configuration is shown whereas FIG. 4 is a front perspective view of the lightning diverter system in the rod retracted configuration. In the rod extended configuration 300, the outer rod includes the first outer rod segment 120 positioned above the housing cabinet 110 and the second outer rod segment 130 positioned above the first outer rod segment. The overall shape of the outer rod in the extended configuration embodies a telescoping rod structure, each rod segment narrowing in diameter as the height of the lightning diverter system increases. The first conductive path to ground 185 in attachment with the housing cabinet. The inner rod 150 is substantially disposed within the outer rod and it in attachment with the outer rod conductively separated by a conductive break 180. In both the rod extended configuration 300 and the rod retracted configuration 400, the inner rod 150 extends beyond the outer rod 140.

Figure 5A:
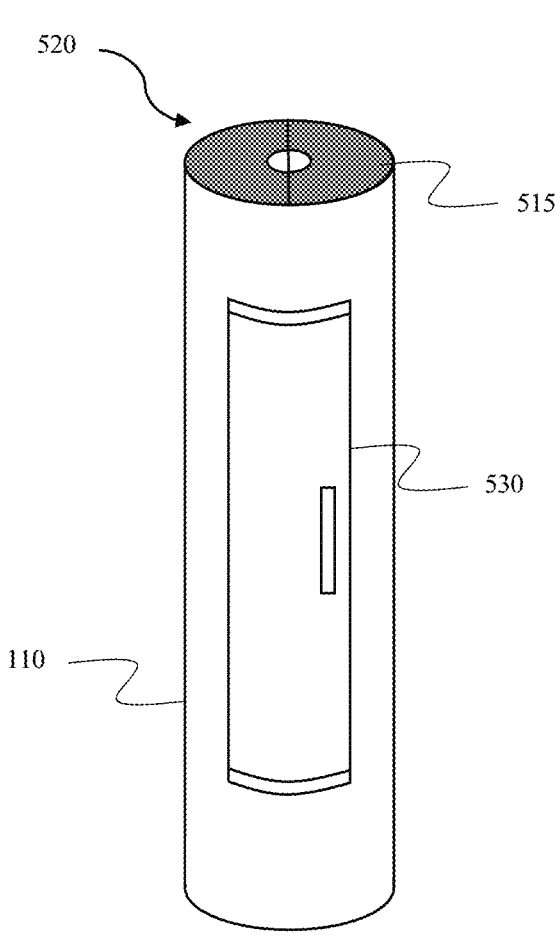
FIG. 5A is a front perspective view of a housing cabinet in a closed configuration, according to an example embodiment.
Figure 5B:
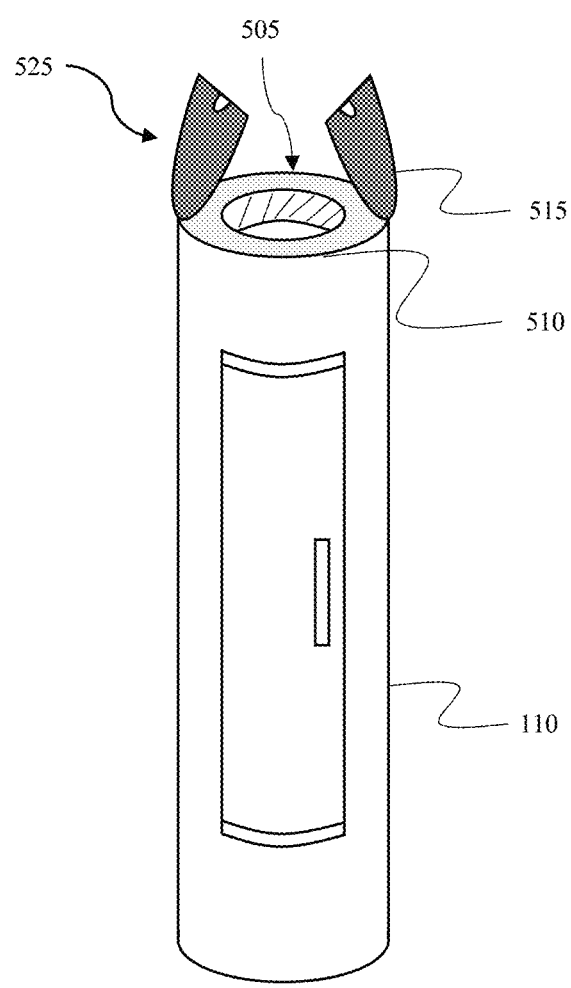
FIG. 5B is a front perspective view of the housing cabinet in an open configuration, according to an example embodiment.

Referring now to FIG. 5A and FIG. 5B, the housing cabinet is shown according to an example embodiment. The housing cabinet may include a lid hingedly attached to the upper end of the housing cabinet having an open and a closed configuration. FIG. 5A illustrates a front perspective view of a housing cabinet in a closed configuration, according to an example embodiment, whereas FIG. 5B illustrates front perspective view of the housing cabinet in an open configuration, according to an example embodiment. The outer housing cabinet having an opening 505 on the upper end 510 of the outer housing cabinet. The housing cabinet may include a lid 515 hingedly attached to the upper end of the cabinet having a lid closed configuration 520 and a lid open configuration 525. In one embodiment, the outer housing cabinet may include access point 530 for a user to access the components of the lightning diverter system. The access point may include an opening in the housing cabinet having a door, latch, window, lid, and other points of entry. The lid may be made from materials such as the second conductive material, rubber bushings, ABS plastic, and other materials to seal the opening of the outer housing cabinet. The lid is configured to open in the rod extended configuration and to close in the rod retracted configuration. In certain embodiments, the lid may open and close by receiving a second signal from the at least one processor. In other embodiments, the lid may open and close based on a force exerted upon it, such as opening due to the upward force of the outer rod and the inner rod moving into the rod extended configuration or closing due to the force of gravity when the first outer rod segment, the second outer rod segment, and the inner rod are substantially enclosed within the housing cabinet.

Figure 5C:
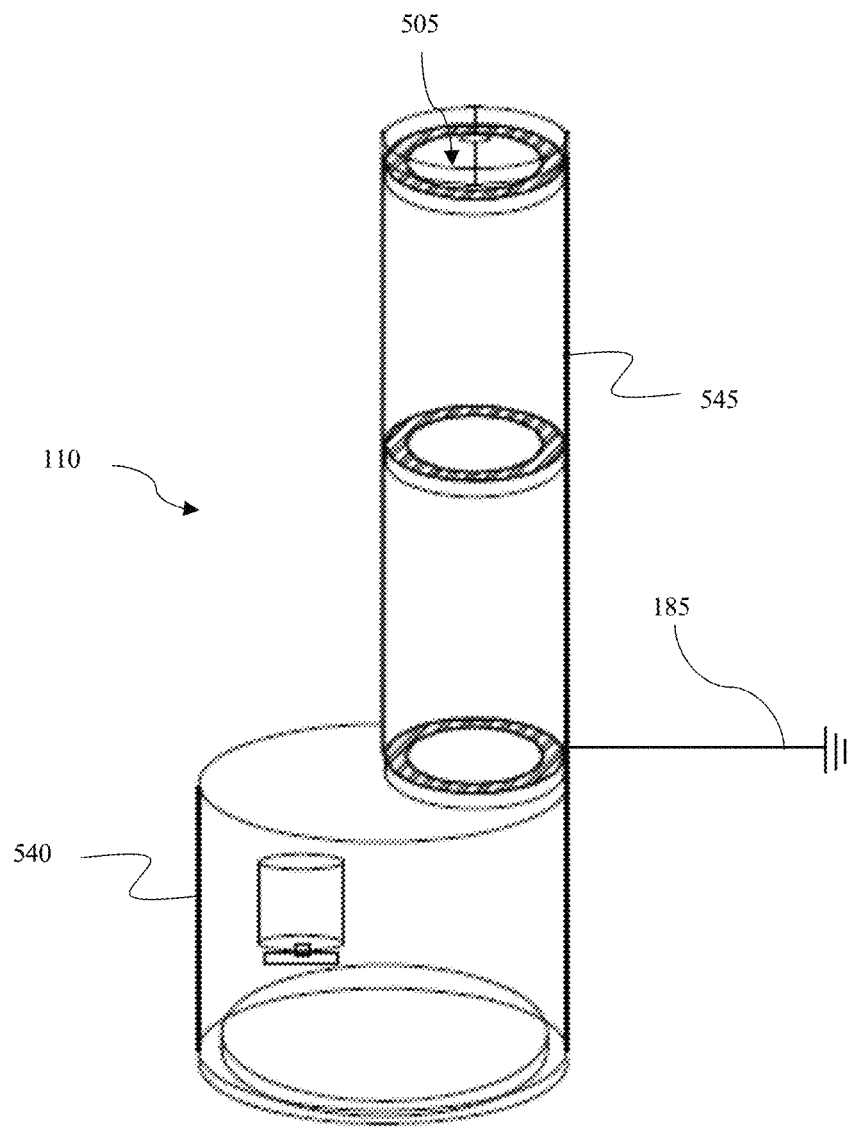
FIG. 5C is a front perspective view of the housing cabinet, according to an example embodiment.

Referring now to FIG. 5C, a front perspective view of the housing cabinet is shown, according to an example embodiment. In one embodiment, the housing cabinet 110 includes an isolation unit 540. The isolation unit may house the electronic components, including the motor, and the at least one processor. The isolation unit may include non-conductive and insulative materials, within the spirt and scope of this disclosure, to protect the electrical components from the voltage diverted throughout the lightning diverter system. By isolating the electrical components, the motor can be offset from the main drive used to rotate the inner core and interact with the gear. The gear may include a belt in connection with the motor such that when the motor is engaged, the main gear is rotated via the belt. Additionally, the housing cabinet may include a modular stack 545 where the modular stack can be configured to increase in height depending on the maximum required height of the lightning rod diverter system. In one embodiment, the inner walls of the modular stack are threaded and defined the first threaded section where the first threaded section includes a conductive material and is configured to threadedly engage the second threaded section of the first outer rod segment. The modular stack may be conductively isolated from the isolation unit such that the modular stack is made from a conductive material and is in connection with the first conductive path to ground 185, and the isolation unit is made from a non-conductive material. The isolation unit and the electronic components may be adjacent to the modular stack in one embodiment.

Figure 6:
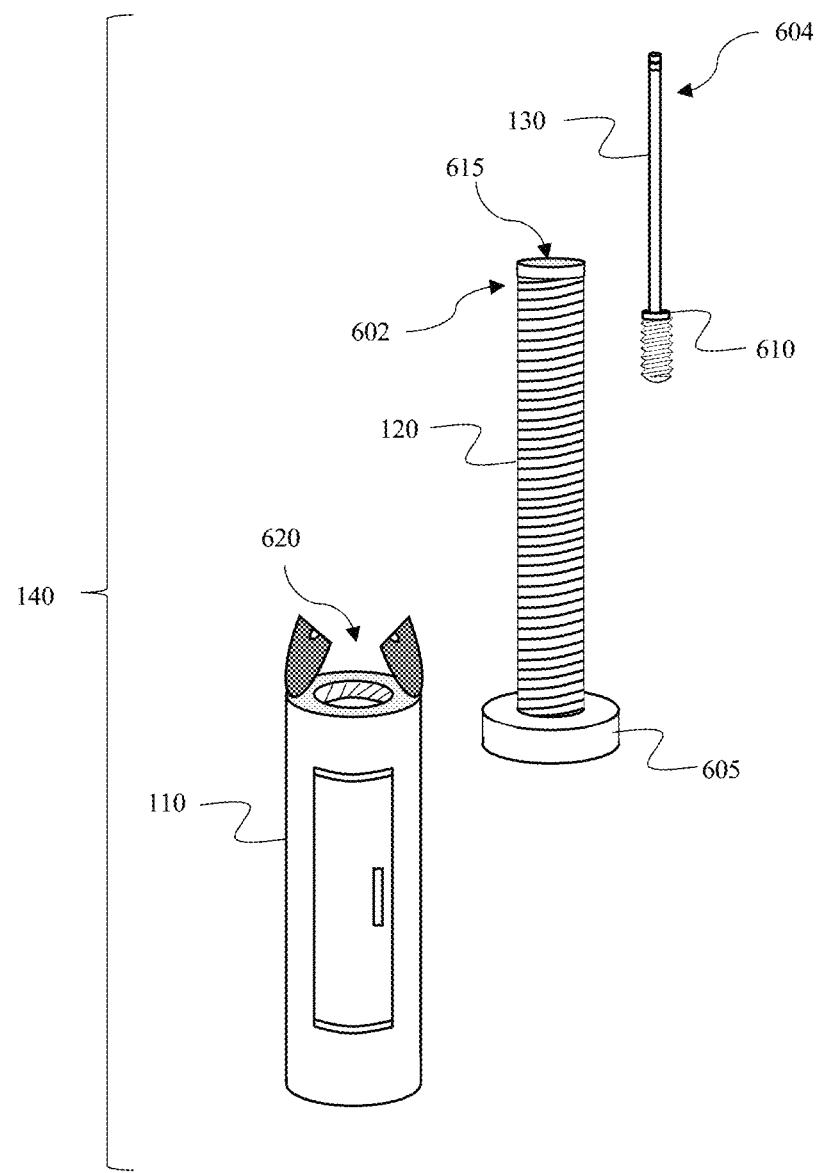
FIG. 6 is an exploded view of the outer rod of the lightning diverter system, according to an example embodiment.

Referring now to FIG. 6, an exploded view of the outer rod 140 of the lightning diverter system is shown, according to an example embodiment. The housing cabinet 110 has an opening 620. The opening 620 has a diameter greater than the diameter of the upper portion 602 of the first outer rod segment 120 to allow the threaded sections of each respective segment to engage each other. The first outer rod segment 120 may include a lip 605 having a diameter greater than the diameter of the opening 620. Therefore, the first outer rod section cannot threadedly engage the housing cabinet beyond the lip. In one embodiment, the lip may include the conductive material of the outer rod, whereas in another embodiment, the lip may include a rubber bushing to create a watertight seal with the opening of the housing cabinet.

The first outer rod segment 120 has an opening 615. The opening 615 has a diameter greater than the diameter of the upper portion 604 of the second outer rod segment 130 to allow second outer rod segment to extend to a position above the first outer rod segment when the fourth threaded section of the second outer rod segment threadedly engages the third threaded section of the first outer rod segment and translates upwards. The second outer rod segment 130 may include a lip 610 having a diameter greater than the diameter of the opening 615. In one embodiment, the lip may include the conductive material of the outer rod, whereas in another embodiment, the lip may include a rubber bushing to create a watertight seal with the opening 615 of the first outer rod segment.

Figure 7:
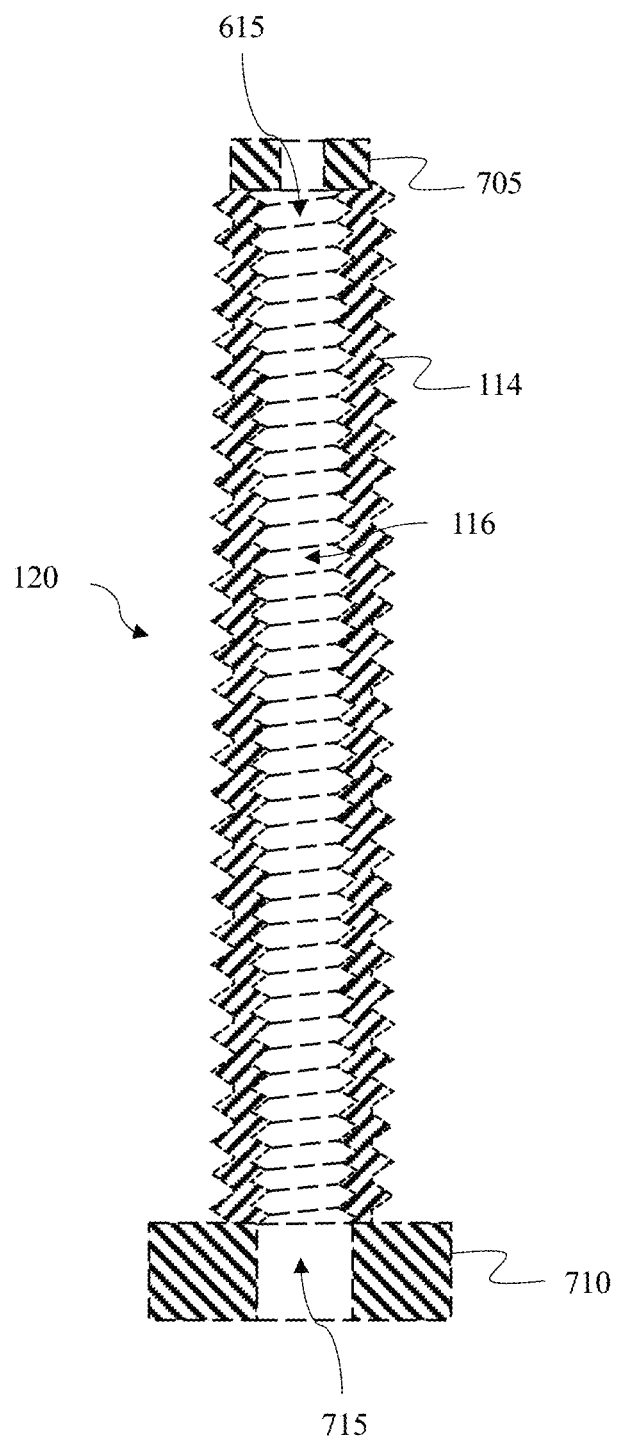
FIG. 7 is a cross sectional view of a first outer rod segment of the outer rod of the lightning diverter system, according to an example embodiment.

Referring now to FIG. 7, a cross sectional view of a first outer rod segment 120 of the outer rod of the lightning diverter system is shown, according to an example embodiment. In one embodiment, the first outer rod segment includes a second threaded section 114 on an outward facing surface and a third threaded section 116 on an inward facing surface. In another embodiment, the first outer rod segment has the opening 615 defined by a lip 705. The lip may include the conductive material of the outer rod in one embodiment, and it may also include a rubber bushing to create a watertight seal with the second outer rod segment in another embodiment. As illustrated, the diameter of the third threaded section 116 is greater than the diameter of the opening 615, therefore the second outer rod segment cannot extend beyond the opening 615. The third threaded section and the second threaded section comprise conductive material such the voltage can travel from the second outer rod segment to the first outer rod segment, to the housing cabinet, to the first conductive path to ground despite the lip 705 and lip 710, which as aforementioned, may include non-conductive materials, such as a rubber bushing. Lip 710 has opening 715 where the inner rod may be concentrically positioned. Lip 710 may be defined by a conductive break, such as conductive break 180, because lip 710 is always contained within the interior cavity of the housing cabinet. Having a conductive break and creating a watertight seal with the opening of the housing cabinet, will protect the electrical component of the lightning diverter system.

Figure 8:
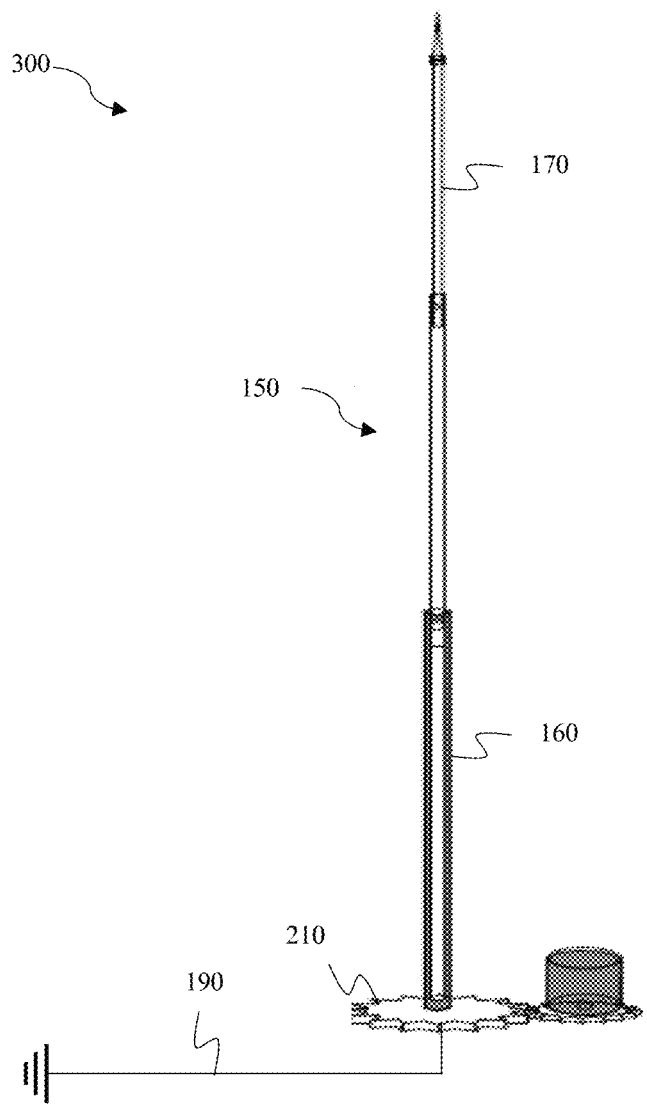
FIG. 8 is a perspective view of an inner rod of the lightning diverter system in the rod extended configuration, according to an example embodiment.
Figure 9:
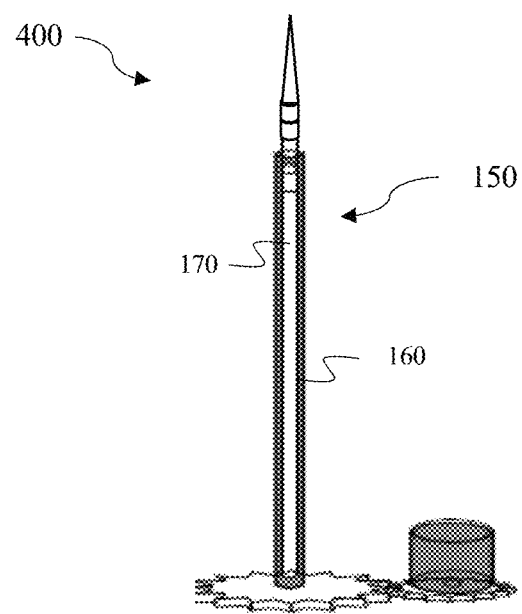
FIG. 9 is a perspective view of an inner rod of the lightning diverter system in the rod retracted configuration, according to an example embodiment.

Referring now to FIG. 8 and FIG. 9, a front perspective view of the inner rod of the lightning diverter system is shown, according to an example embodiment. FIG. 8 is a perspective view of an inner rod of the lightning diverter system in the rod extended configuration, according to an example embodiment. FIG. 9 is a perspective view of the inner rod of the lightning diverter system in the rod retracted configuration, according to an example embodiment. The inner rod 150 includes the first inner rod segment 160 and the second inner rod segment 170.

In the rod extended configuration 300, the second inner rod segment 170 positioned above the first inner rod segment 160. The first inner rod segment will primarily be positioned within the interior of the housing cabinet and fully disposed within the outer rod. The overall shape of the inner rod in the extended configuration embodies a telescoping rod structure, each rod segment narrowing in diameter as the height of the lightning diverter system increases. The second conductive path to ground 190 is in attachment with the inner rod. The inner rod is also in attachment with the gear 210, specifically, the first inner rod segment 160 is in attachment with the gear 210. In the rod retracted configuration 400, the second inner rod segment 170 is substantially disposed within the first inner rod segment, telescoping within the first inner rod segment. In certain embodiments the upper end of the second inner rod segment may extend beyond the first inner rod segment in the retracted configuration. The inner rod includes a plurality of rod segments, namely, the first inner rod segment and the second inner rod segment. It is understood that other amounts of rod segments may also be used and are within the spirit and scope of the present disclosure.

Figure 10A:
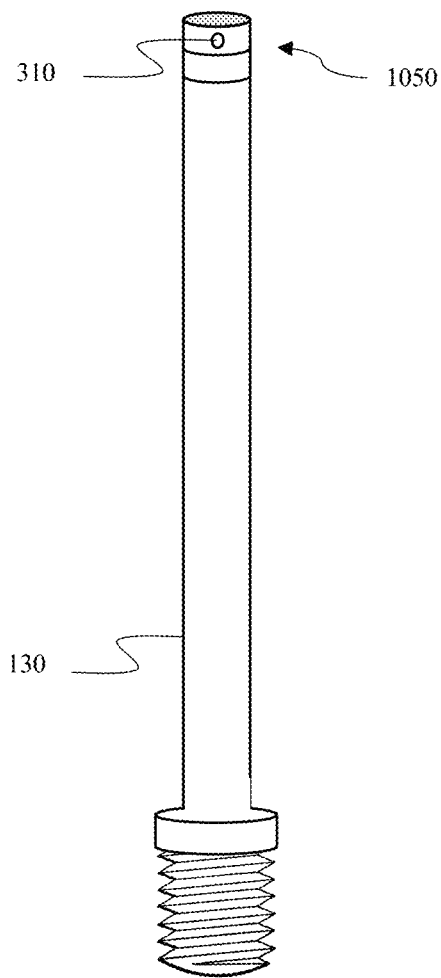
FIG. 10A is perspective view a second outer rod segment of the outer rod of the lightning diverter system, according to an example embodiment.
Figure 10B:
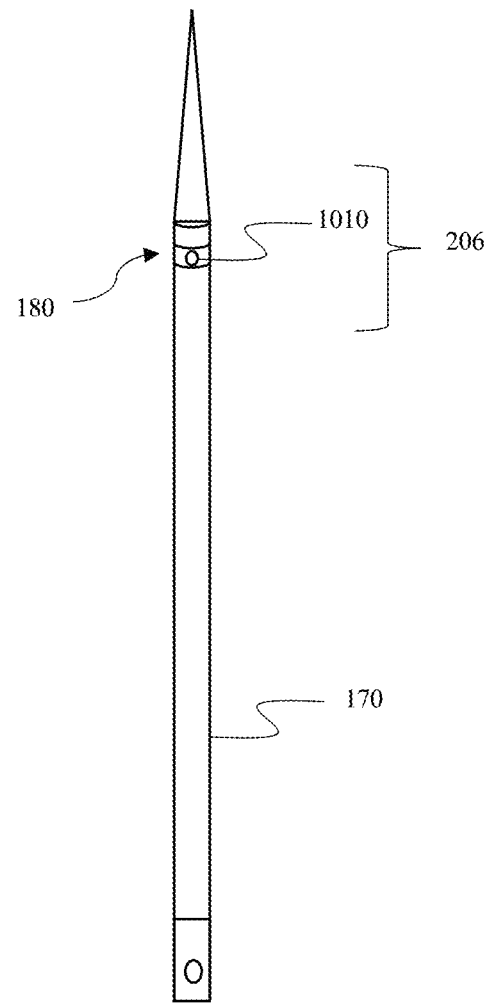
FIG. 10B is perspective view a second inner rod segment of the inner rod of the lightning diverter system, according to an example embodiment.

Referring now to FIG. 10A and FIG. 10B, the second outer rod segment and the second inner rod segment are shown to illustrate the inner rod in attachment with the outer rod, according to an example embodiment. FIG. 10A is a perspective view a second outer rod segment of the outer rod of the lightning diverter system, according to an example embodiment. FIG. 10B is a perspective view a second inner rod segment of the inner rod of the lightning diverter system, according to an example embodiment. The second outer rod segment 130 is in attachment with the second inner rod segment 170. The second inner rod segment and the second outer rod segment are in attachment by a fastener 1010, where the upper portion 206 of the second inner rod segment is connected by a fastener to an upper portion 1050 of the second outer rod segment. The fastener may include connections such as a dowel pin, joiner, hinge, shaft, magnet, and other connections. The fastener may be threaded or smooth and may include materials such as steel, aluminum, steel alloy, wood, galvanized steel, plastic, plastic alloy, and other materials. In one embodiment, because the fastener will fixedly join the inner rod and the outer rod, the inner rod and the outer rod are configured to rotate in like directions to move the lightning diverter system between the rod extended configuration and the rod retraced configuration.

The outer rod may be made of a second conductive material and the inner rod may be made of a first conductive material, namely, the second outer rod segment and the second inner rod segment. The system will include at least one conductive break 180 between the outer rod and the inner rod. In some embodiments, the fastener 1010 may be non-conductive and serve as the conductive break between the inner rod and the outer rod. In other embodiments, the fastener may be coated with a non-conductive or insulating material to provide a conductive break. A conductive break 180 is between a first conductive material of the inner rod and a second conductive material of the outer rod where the first conductive material may contact the second conductive material or where a first conductive material may be in attachment with the second conductive material. The conductive beak allows there to be two conductive paths to ground, the first conductive path to ground defined by the outer rod and the second conductive path to ground defined by the inner rod.

In other embodiments, the second outer rod segment 130 may be fixedly attached to the second inner rod segment such that the second inner rod segment and the second outer rod segment define a unitary rod segment. The interior of the unitary rod segment would define the inner rod and be operationally attached to a motor configured to rotate the second outer rod segment such that the fourth threaded section 118 threadedly engages the third threaded section 116 of the first outer rod segment.

Referring now to FIG. 11, a partially exploded view of the lightning diverter system illustrating the movement between the rod extended configuration and the rod retraced configuration is shown, according to an example embodiment. It is understood that the inner rod is in attachment with the outer rod such that the second inner rod segment is in attachment with the second outer rod segment. The second inner rod segment and the second outer rod segment may be in attachment via a fastener or other means of securing such that the second outer rod segment and the first outer rod segment uniformly rotate in a like direction.

FIG. 11 illustrates a partially exploded view of the outer rod 140 of the lightning diverter system. When the at least one processor receives at least one first signal from at least one sensor of the lightning diverter system, then the at least one processor determines whether an environmental parameter of the at least one first signal fails to satisfy a respective environmental parameter threshold. If the at least one processor determines that environmental parameter failed to satisfy the environmental parameter, then the at least one processor is configured for sending at least one second signal to the electrical components of the lightning diverter system. The electrical components may include a motor 1150 in communication with the processor. The motor may include motors such as AC brushless motors, DC brushless motors, DC brushed motors, direct drive motors, linear motors, servo motors, and stepper motors. The motor, in electrical communication with the power source may include a converter or an inverter to supply power to the motor. The at least one second signal will engage the motor to rotate a gear 1170. In one embodiment, the motor is in attachment with the gear such that the motor may rotate the gear using a belt. The rotation of the gear 1170 causes the inner rod to rotate. Because the inner rod is in attachment with the outer rod via the second inner rod segment and the second outer rod segment, the outer rod begins to rotate, and the threaded sections engage each other to move the lightning diverter system move between the retracted configuration and the rod extended configuration. FIG. 11 further illustrates the different forces that may act on the lightning diverter system as well as the direction of the movement of the inner rod and the outer rod.

The housing cabinet includes the first threaded section 112 on an inward facing surface 1110 of the outer housing cabinet, the first outer rod segment includes the second threaded section 114 on an outward facing surface 1115 of the first outer rod segment and a third threaded section 430 on an inward facing surface 1120 of the first outer rod segment, and the second outer rod segment includes the fourth threaded section 118 on an outward facing surface 1125 of the second outer rod segment.

The inner rod 150 is operationally coupled to a gear 1170 which is operatively engaged with a motor 1150. Once engaged by the at least one processor, the motor drives a gear that rotates the inner rod. When a motor rotates in direction illustrated by curved arrowed line A, the gear and the inner rod rotate in an opposite direction (in the direction of the curved arrow line B). Because the inner rod is in attachment with the outer rod via the second outer rod segment and the second inner rod segment the outer rod begins to rotate, specifically, the second outer rod segment rotates uniformly with direction B, in direction C. It is understood that direction B and direction C are the same direction; however, direction B refers to the rotation of the inner rod and direction C refers to the direction of the outer rod. As the second outer rod segment rotates, the fourth threaded section 118 threadedly engages the third threaded section 116 by rotating in a direction C. As mentioned above, one of the improvements over the prior art is that the threaded sections and rotating elements of the current disclosure provides an increased amount of structural rigidity. If originally in the rod retracted configuration, then the rotation in the direction C causes the second outer rod segment to translate in a direction of line E. Likewise, if originally in the rod extended configuration, then the rotation of the second outer rod segment in direction C causes the second outer rod segment to translate in direction F. For example, if the inner rod is rotating such that direction B is counterclockwise, direction C will also be counterclockwise, and the second outer rod segment may translate in direction E, and visa vera where a clockwise rotation would cause a translation in direction F. It is understood that translating in either direction corresponds to the threaded sections engaging each outer like a screw.

If second outer rod segment is translating in the direction of line E, then the second outer rod segment will translate a distance equivalent to the length of the first outer rod segment, a length of line D. Once translating the entire length D, the second outer rod segment will cause the second threaded section 114 to threadedly engage the first threaded section 112, likewise rotating in direction C, and further causing the first outer rod segment t to translate the length D in the direction of line E. In one embodiment, the second outer rod segment at least one of (i) locks with the first outer rod segment when if translates the entire length D because there are no more threaded sections and (ii) includes a lip on the bottom portion of the second outer rod segment that is configured to interact with a top portion of the first outer rod segment.

Similarly, in one embodiment, if the second outer rod segment is translating in a direction of line F, then the second outer rod segment will translate an entire length D. Once translating the entire length D, the second outer rod segment will cause the second threaded section 114 to threadedly engage the first threaded section 112 of the housing cabinet further causing the first outer rod segment to translate the length D in the direction of line F.

It is understood that a translation in direction E will result in rod extended configuration, whereas a translation in direction F will result in the rod retracted configuration. The at least one second signal engages the motor to rotate such that the second outer rod segment translates in the direction E when the at least one environmental parameter fails to satisfy a respective environmental parameter threshold. Similarly, the at least one second signal engages the motor to rotate such that the second outer rod segment translates in the direction F when the at least one environmental parameter satisfies a respective environmental parameter threshold. Additionally, to move from the retracted configuration to the extended configuration, or vis versa, the motor will change the direction of rotation A to the opposite direction, respectively.

The inner rod and outer rod are in attachment such that the connection between the second inner rod segment and the second outer rod segment can withstand the torsion forces within the lightning diverter system and produce enough torque, via the motor, to rotate the first outer rod segment. The motor drives the gear in engagement with at least one of the inner rod and the outer rod such that when the gear is rotated the inner rod and the outer rod move between the rod extended configuration and the rod retracted configuration. In one embodiment, the gear is in attachment with the inner rod such that rotating the gear corresponds to rotating the inner rod.

Figure 12:
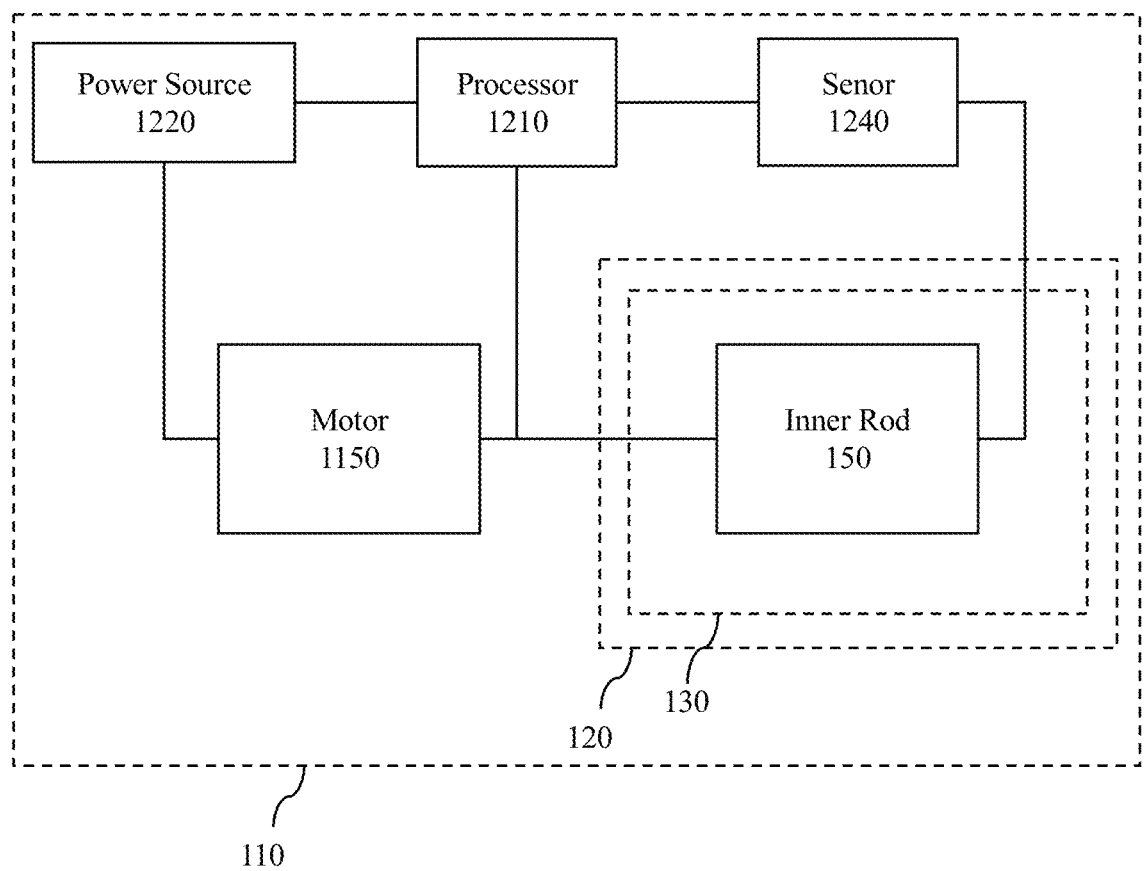
FIG. 12 is a block diagram of the electrical components of the lightning diverter system, according to an example embodiment.

Referring now to FIG. 12, a block diagram of the electrical components of the lightning diverter system is shown, according to an example embodiment. The electrical components of the system include a power source 1220, a motor 1150, at least one processor 1210, at least one sensor 1240. The lightning diverter system may further include the motor 1150 in electrical communication with the at least one processor 1210, and a power source 1220. Various configurations of the integration and connectivity of the power source, the at least one processor, the motor, the at least one sensor, and inner rod and outer rod are possible within the spirit and scope of the disclosure.

The power source may include any power source configured to provide power to the electrical components of the lightning diverter system and to allow the motor to produce enough torque to move the lightning diverter system between the rod extended configuration and the rod retracted configuration. The power source may be derived from solar, wind, battery, utility power, etc. In one embodiment, power source includes at least one of a solar panel and a lithium-ion battery. The motor drives the gear that rotates the inner rod 150. In one embodiment the electrical components are stored within the housing cabinet 110. In another embodiment, the electronic components are adjacent to the housing cabinet such that the housing cabinet includes an insolation unit for housing the electronic components separate from the conductive elements, and a modular stack having the inner rod concentrically disposed within. In another embodiment, the electrical components may be adjacent to the housing cabinet or outside of the housing cabinet and in mechanical communication with the inner rod. For example, the at least one processor may include a network having a server connected to the internet and the at least one sensor may include a plurality of sensors positioned around the exterior of a consumer's property in communication with the at least one processor and the motor. The electrical components may be disposed within the cavity of the housing cabinet and adjacent to the first outer rod segment and second outer rod segment; however, the motor is in electrical communication with the at least one processor and a gear, where the gear mechanically interacts with the inner rod to move the lightning diverter system between the rod extended and rod retracted configurations.

In one embodiment, the at least one sensor is configured to monitor static electricity within a predetermined area of the lightning diverter system. The at least one sensor is in communication with the least one processor such that the at least one sensor sends a first signal to the at least one processor. The at least one processor sensor communicates the data recorded about the environmental parameter over the first signal sent to the at least one processor. If the at least one processor determines that that the environmental parameter fails to satisfy the respective environmental parameter threshold then the at least one processor sends at least one second signal to the motor to rotate in direction A moving the lightning diverter system into its respective rod extended configuration or rod retracted configuration. As mentioned, above the as the motor rotates, the gear rotates causing the inner rod to rotate, which in turn causes the second outer rod segment and the first outer rod segment to rotate. It is understood that other systems and systems may be used to determine the configuration of the system prior to engaging the motor such that, for example, if the environmental parameter continuously fails to satisfy the respective environmental parameter threshold and the system is already in the rod extended configuration, then there is no need to send a second signal and engage the motor, and vice versa.

Figure 13:
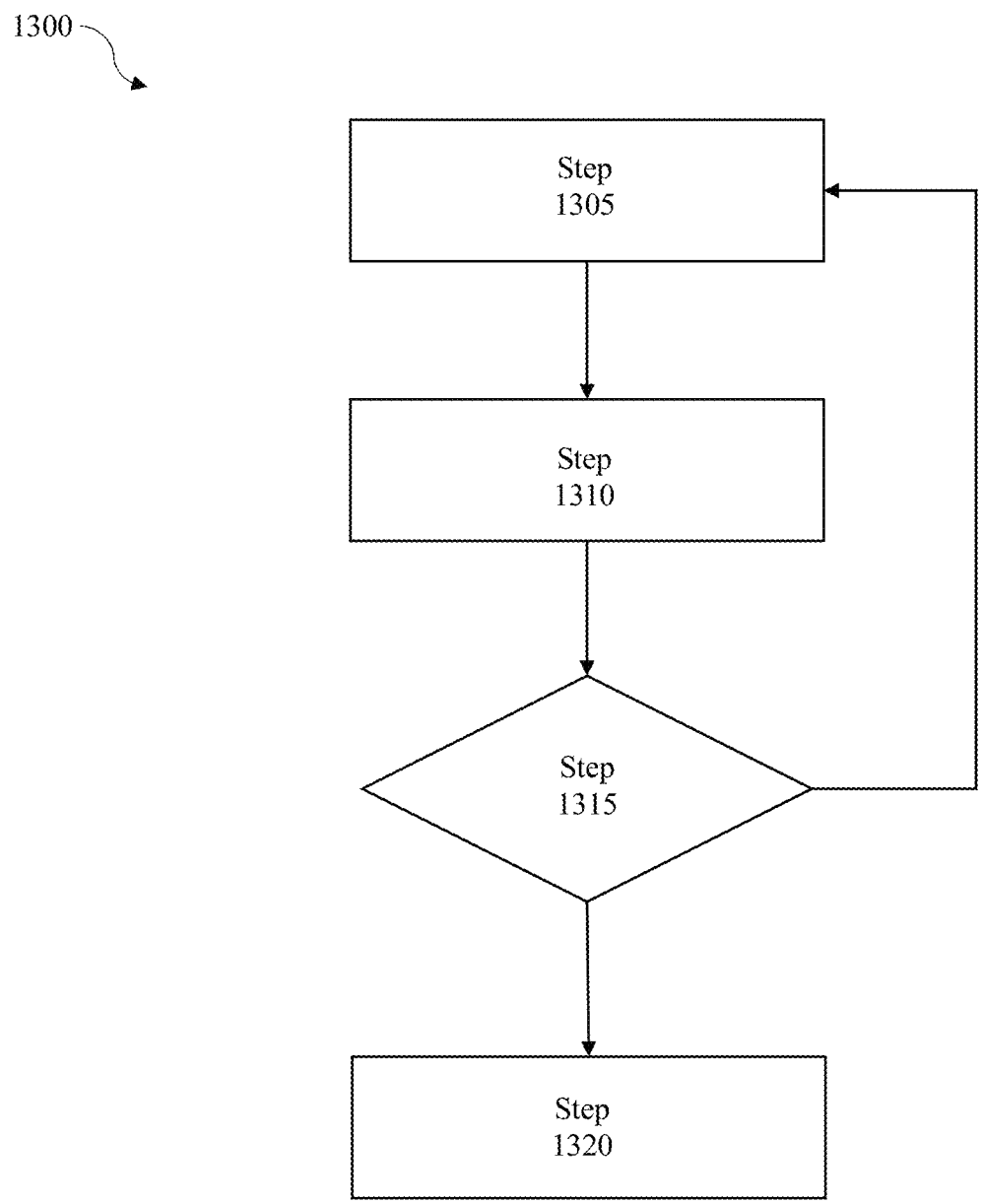
FIG. 13 is a block diagram illustrating a method performed by the lightning diverter system, specifically, by at least one processor, according to an example embodiment.

Referring now to FIG. 13, a block diagram illustrating a method 1300 performed by the lightning diverter system, specifically, by at least one processor, is shown, according to an example embodiment. At step 1305, at least one sensor is configured for monitoring at least one environmental parameter and sending at least one first signal to at least one processor. The at least one environmental parameter may include a static charge within a predetermined area. In an additional embodiment, the at least one environmental parameter threshold comprises a maximum static charge within the predetermined area. Other environmental parameters may include wind speed and light flashes. The at least one first sensor may include a plurality of sensors configured for monitoring the weather including humidity readings within the ambient air or within a predetermined area. In addition, the plurality of sensors may be configured for sensing precipitation, including current precipitation rates, as well as tracking a history of precipitation in the area. In an additional embodiment, the plurality of sensors may be configured for measuring wind speed and direction. Furthermore, the plurality of sensors may be configured for measuring barometric pressure, in an additional embodiment. The plurality of sensors may be configured for monitoring the temperature of the air and any nearby soil or water, as well as nearby soil moisture. The at least one sensor may include other sensors within the spirit and scope of the disclosure.

The predetermined area may be a predetermined radius as limited by the range of the at least one sensor. In other embodiments, the lightning diverter system may be in communication with other lightning detection systems capable of detecting lightning and electrical activity within a predetermined area such that the lightning diverter system is in communication with at least one processor connected to an internet network configured to monitor local weather activity. For example, certain local parks have live lightning detection monitoring systems that are configured to sound alarms when lightning is detected within a predetermined area, such as a seven-mile radius for example. The lightning diverter system may be in communication with such monitoring systems and is configured to receive at least one first signal.

In step 1310 the at least one processor is configured for receiving the at least one first signal from the at least one sensor. At step 1315, the at least one processor is configured for determining if the at least one environmental parameter fails to satisfy at least one environmental parameter threshold. Where the at least one environmental parameter threshold include a maximum static charge within the predetermined area, then the at least one processor will determine if the static electricity within the predetermined area exceeds the allowable threshold. If the environmental parameter fails to satisfy the environmental parameter threshold, then the at least one processor sends at least one second signal at step 1320. Otherwise, the lightning diverter system continues to monitor the at least one environmental parameter at step 1305. It is understood that the lightning diverter system continuously monitors the at least one environmental parameter.

In step 1320 the at least one processor is configured for sending at least one second signal to at least one of a plurality of electrical components in electrical communication with the at least one processor. The plurality of electrical components may include the at least one motor. The at least one second signal may include information configured to engage the motor in to drive the lightning diverter system into either the rod extended configuration, or the rod retracted configuration. For example, if the at least one processor determines that the static electricity within the predetermined area exceeds the maximum static electricity threshold, then the at least one processor will send at least one second signal to the motor to drive the lightning diverter system into the rod extended configuration. Transversely, if the if the at least one processor determines that the static electricity within the predetermined area does not exceed the maximum static electricity threshold, then the at least one processor will send at least one second signal to the motor to drive the lightning diverter system into the rod retracted configuration.

Figure 14:
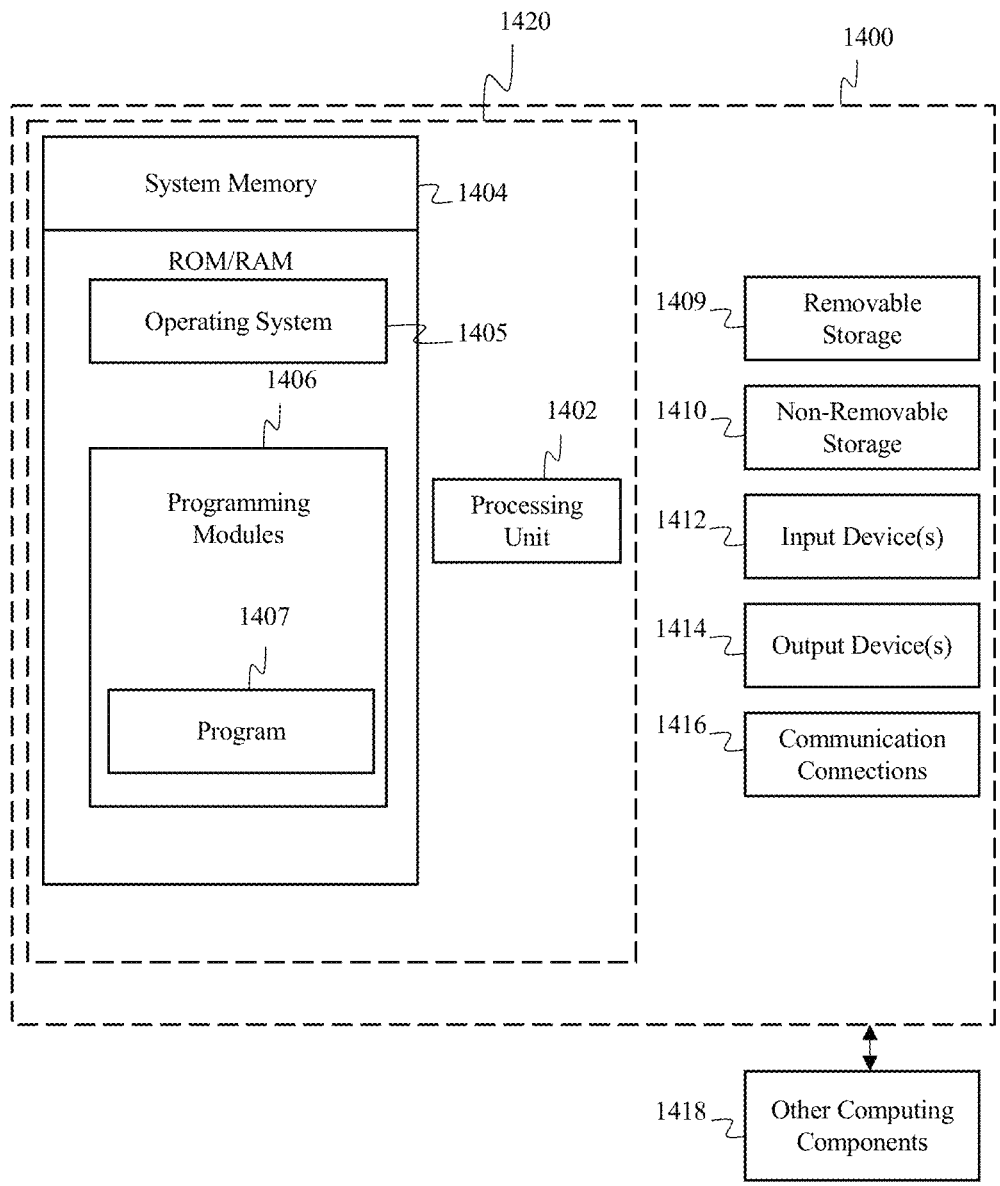
FIG. 14 is a block diagram of the lightning diverter system including an example computing device and other computing devices, according to one example embodiment.

The embodiment of FIG. 14 is a block diagram of a lightning diverter system including an example computing device 1400 and other computing devices. Consistent with the embodiments described herein, the aforementioned actions performed by the lightning diverter system may be implemented in a computing device, such as the computing device 1400 of FIG. 14. Any suitable combination of hardware, software, or firmware may be used to implement the computing device. The aforementioned lightning diverter system, device, and processors are examples and other lightning diverter systems, devices, and processors may comprise the aforementioned computing device. Furthermore, computing device may comprise an operating environment for the lightning diverter system. Processes, data related to lightning diverter system may operate in other environments and are not limited to computing device 1400.

A lightning diverter system consistent with an embodiment of the disclosure may include a plurality of computing devices, such as computing device 1400. In a basic configuration, computing device may include at least one processing unit 1402 and a system memory 1404. Depending on the configuration and type of computing device, system memory may comprise, but is not limited to, volatile e.g., random-access memory RAM, non-volatile e.g., read-only memory ROM, flash memory, or any combination or memory. Lightning diverter memory may include operating system 1405, and one or more programming modules 1406. Operating the lightning diverter system, for example, may be suitable for controlling computing device's operation. In one embodiment, programming modules may include, for example, a program module 1407 for executing the actions of the lightning diverter system for example, specifically, the processor 1230. Furthermore, embodiments of the disclosure may be practiced in conjunction with a graphics library, other operating lightning diverters, or any other application program and is not limited to any particular application or lightning diverter system. This basic configuration is illustrated in FIG. 14 by those components within a dashed line 1420.

Computing device 1400 may have additional features or functionality. For example, computing device may also include additional data storage devices removable and/or nonremovable such as, for example, magnetic disks, optical disks, or tape. Such additional storage is illustrated in FIG. 14 by a removable storage 1409 and a non-removable storage 1410. Computer storage media may include volatile and nonvolatile, removable, and non-removable media implemented in any method or technology for storage of information, such as computer readable instructions, data structures, program modules, or other data. System memory, removable storage, and non-removable storage are all computer storage media examples i.e., memory storage. Computer storage media may include, but is not limited to, RAM, ROM, electrically erasable read-only memory EEPROM, flash memory or other memory technology, CD-ROM, digital versatile disks DVD or other optical storage, magnetic cassettes, magnetic tape, magnetic disk storage or other magnetic storage devices, or any other medium which can be used to store information, and which can be accessed by computing device 1400. Any such computer storage media may be part of computing device 1400. Computing device may also have input devices 1412 such as a keyboard, a mouse, a pen, a sound input device, a camera, a touch input device, etc. Output devices 1414 such as a display, speakers, a printer, etc. may also be included. The aforementioned devices are only examples, and other devices may be added or substituted.

Computing device 1400 may also contain a communication connection 1416 that may allow the lightning diverter system to communicate with other computing devices 1418, such as over a network in a distributed computing environment, for example, an intranet or the Internet. Communication connection is one example of communication media. Communication media may typically be embodied by computer readable instructions, data structures, program modules, or other data in a modulated data signal, such as a carrier wave or other transport mechanism, and includes any information delivery media. The term "modulated data signal" may describe a signal that has one or more characteristics set or changed in such a manner as to encode information in the signal. By way of example, and not limitation, communication media may include wired media such as a wired network or direct-wired connection, and wireless media such as acoustic, radio frequency RF, infrared, and other wireless media. The term computer readable media as used herein may include both computer storage media and communication media.

As stated above, a number of program modules and data files may be stored in system memory 1404, including operating system 1405. While executing on at least one processing unit 1402, programming modules 1406 e.g., program module 1407 may perform processes including, for example, one or more of the stages of a process. The aforementioned processes are examples, and at least one processing unit 1402 may perform other processes. Other programming modules that may be used in accordance with embodiments of the present disclosure may include electronic mail and contacts applications, word processing applications, spreadsheet applications, database applications, slide presentation applications, drawing or computer-aided application programs, etc.

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

We claim:

1. A lightning diverter system comprising:
   a. a housing cabinet having an opening on an upper end of the housing cabinet;
   b. an outer rod comprising a first outer rod segment, a second outer rod segment, and the housing cabinet;
   c. an inner rod comprising a first inner rod segment and a second inner rod segment;
      i. wherein the second inner rod segment is in attachment with the second outer rod segment;
      ii. wherein the inner rod and the outer rod are concentric and configured to move between a rod extended configuration and a rod retracted configuration;
   c. at least one sensor configured for monitoring at least one environmental parameter and sending at least one first signal to at least one processor configured for:
      i. receiving the at least one first signal from the at least one sensor;
      ii. determining if the at least one environmental parameter fails satisfy at least one environmental parameter threshold;
      iii. sending at least one second signal to at least one of a plurality of electrical components in electrical communication with the at least one processor;
   d. a first threaded section on an inward facing surface of the opening of the housing cabinet; and
   e. a second threaded section on an outward facing surface of the first outer rod segment configured to threadedly engage with the first threaded section.

2. The lightning diverter of claim 1 further comprising:
   a. a conductive break in attachment with the outer rod and the inner rod;
   b. a third threaded section on an inward facing surface of the first outer rod segment; and
   c. a fourth threaded section on an outward facing surface of the second outer rod segment configured to threadedly engage with the third threaded section.

3. The lightning diverter of claim 2 further comprising:
   a. a motor in electrical communication with the at least one processor; and
   d. a power source.

4. The lightning diverter system of claim 3, wherein the motor drives a gear in engagement with at least one of the inner rod and the outer rod such that when the gear is rotated the inner rod and the outer rod move between the rod extended configuration and the rod retracted configuration.

5. The lightning diverter system of claim 4, wherein the gear is in attachment with the inner rod.

6. The lightning diverter system of claim 5, wherein the inner rod is substantially disposed within the outer rod.

7. The lightning diverter system of claim 1, wherein the outer rod comprises a first conductive path to ground, and the inner rod comprises a second conductive path to the ground.

8. The lightning diverter system of claim 7, where an upper portion of second outer rod segment is connected by a fastener to an upper portion of second inner rod segment.

9. The lightning diverter system of claim 8, wherein the at least one environmental parameter comprises a static charge within a predetermined area.

10. The lightning diverter system of claim 9, wherein the at least one environmental parameter threshold comprises a maximum static charge within the predetermined area.

11. A lightning diverter system comprising:
    a. a housing cabinet having an opening on an upper end of the housing cabinet;
       i. wherein the housing cabinet comprises a first threaded section on an inward facing surface on the opening of the housing cabinet;
    b. an outer rod comprising a first outer rod segment, a second outer rod segment, and the housing cabinet;
       i. wherein the first outer rod segment comprises a second threaded section on an outward facing surface of the first outer rod segment and a third threaded section on an inward facing surface of the first outer rod segment;
       ii. wherein the second threaded section is configured to threadedly engage the first threaded section;
       iii. wherein the second outer rod segment comprises a fourth threaded section on an outward facing surface of the second outer rod segment configured to threadedly engage the third threaded section;
    c. an inner rod comprising a first inner rod segment and a second inner rod segment;
       i. wherein the second inner rod segment is in attachment with the second outer rod segment;
       ii. wherein the inner rod and the outer rod are configured to move between a rod extended configuration and a rod retracted configuration;
    d. a conductive break between the outer rod and the inner rod;
    e. wherein the outer rod comprises a first conductive path to a ground; and
    f. wherein the inner rod comprises a second conductive path to the ground.

12. The lightning diverter system of claim 11 further comprising:
    a. at least one sensor configured for monitoring at least one environmental parameter and sending at least one first signal to at least one processor configured for:
       i. receiving the at least one first signal from the at least one sensor;
       ii. determining whether the at least one environmental parameter fails satisfy at least one environmental parameter threshold; and
       iii. sending at least one second signal to at least one of a plurality of electrical components in electrical communication with the at least one processor.

13. The lightning diverter system of claim 12, wherein the at least one environmental parameter comprises a static charge within a predetermined area.

14. The lightning diverter system of claim 13, wherein the at least one environmental parameter threshold comprises a maximum static charge within the predetermined area.

15. A lighting diverter system comprising:
    a. an outer rod comprising at least a first partially tubular shaped body, an opening on a top portion of the outer rod, and a first threaded section on an inward facing surface of the opening; and b. an inner rod comprising at least a second partially tubular shaped body and a second threaded section on an outward facing surface of the inner rod configured to threadedly engage with the first threaded section of the outer rod;

wherein the inner rod and the outer rod are concentric and configured to move between a rod extended configuration and a rod retracted configuration.

16. The lightning diverter system of claim 15 comprising a conductive break in attachment with the outer rod and the inner rod.

17. The lightning diverter system of claim 15 comprising at least one sensor configured for monitoring at least one environmental parameter and sending at least one first signal to at least one processor configured for:

i. receiving the at least one first signal from the at least one sensor;

ii. determining if the at least one environmental parameter fails satisfy at least one environmental parameter threshold; and iii. sending at least one second signal to at least one of a plurality of electrical components in electrical communication with the at least one processor.

18. The lightning diverter system of claim 15 wherein the outer rod is grounded.

19. The lightning diverter system of claim 15 wherein the inner rod is grounded.

20. The lightning diverter system of claim 15 wherein the inner rod comprises an opening on a top portion of the inner rod and wherein the lightning diverter system further comprises a second inner rod concentrically disposed within the rod such that the second inner rod telescopically engages the inner rod.

* * * * *